(12) United States Patent  (10) Patent No.: US 7,110,388 B2
Hameleers et al.  (45) Date of Patent: Sep. 19, 2006

(54) HANDLING OF CIRCUIT-SWITCHED DATA SERVICES IN IP-BASED GSM NETWORKS

(75) Inventors: Heino Hameleers, Kerkrade (NL); Frank Hundscheidt, Kerkrade (NL)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 823 days.

(21) Appl. No.: 09/773,245

(22) Filed: Jan. 31, 2001

(65) Prior Publication Data
US 2001/0030954 A1  Oct. 18, 2001

(30) Foreign Application Priority Data
Feb. 3, 2000 (EP) .................................. 00102321

(51) Int. Cl.
*H04J 3/24* (2006.01)
*H04L 12/66* (2006.01)
(52) U.S. Cl. ................ 370/349; 370/353; 370/474; 455/426.1
(58) Field of Classification Search ................ 370/229, 370/469, 337, 338, 468, 351–353, 332, 401, 370/389, 474, 345, 528, 349, 542; 709/249; 455/332, 436, 340, 452, 560, 426, 452.1, 455/561, 426.1
See application file for complete search history.

(56) References Cited
U.S. PATENT DOCUMENTS
4,777,595 A * 10/1988 Strecker et al. ............. 709/236

5,175,765 A * 12/1992 Perlman ....................... 380/30
5,420,862 A *  5/1995 Perlman ....................... 370/401

(Continued)

FOREIGN PATENT DOCUMENTS
WO  WO 97/16007  5/1997

(Continued)

OTHER PUBLICATIONS
Danielidis, S., European Search Report, Appl. No. EP 00102321, Jul. 4, 2000, pp. 1-3.

*Primary Examiner*—Doris H. To
*Assistant Examiner*—Ian N. Moore

(57) ABSTRACT

A communication network element or part and a method for operating a communication network part are disclosed. The communication network part includes a first layer for transferring signalling information assigned to a telephone call being processed in the network and a second layer for transferring payload information assigned to the telephone call. An interface couples the network to a further network and includes a signalling information exchange function and user or payload information exchange function between the network and the further network. The second layer generates an information frame which includes user information of the telephone call being transferred to and from the interface on a direct route assigned to the telephone call within the second layer and selectively suppresses the transfer of an information frame within the second layer if the information frame does not include any user information.

36 Claims, 5 Drawing Sheets

U.S. PATENT DOCUMENTS

| | | | |
|---|---|---|---|
| 5,446,736 A * | 8/1995 | Gleeson et al. | 370/473 |
| 5,590,133 A | 12/1996 | Billström et al. | 370/349 |
| 6,335,933 B1 * | 1/2002 | Mallory | 370/394 |
| 6,389,016 B1 * | 5/2002 | Sabaa et al. | 370/389 |
| 6,400,712 B1 * | 6/2002 | Phillips | 370/355 |
| 6,404,754 B1 * | 6/2002 | Lim | 370/338 |
| 6,434,140 B1 * | 8/2002 | Barany et al. | 370/352 |
| 6,466,556 B1 * | 10/2002 | Boudreaux | 370/331 |
| 6,473,425 B1 * | 10/2002 | Bellaton et al. | 370/392 |
| 6,487,201 B1 * | 11/2002 | Seo | 370/394 |
| 6,507,649 B1 * | 1/2003 | Tovander | 379/230 |
| 6,529,524 B1 * | 3/2003 | Liao et al. | 370/467 |
| 6,594,486 B1 * | 7/2003 | Rasanen | 455/422.1 |
| 6,694,372 B1 * | 2/2004 | Grossman | 709/236 |
| 6,718,500 B1 * | 4/2004 | Lee et al. | 714/749 |
| 6,735,441 B1 * | 5/2004 | Turgeon et al. | 455/433 |
| 6,791,988 B1 | 9/2004 | Hameleers et al. | |
| 2002/0128017 A1 * | 9/2002 | Virtanen | 455/452 |

FOREIGN PATENT DOCUMENTS

| | | |
|---|---|---|
| WO | WO 98/15152 | 4/1998 |
| WO | WO 98/23079 | 5/1998 |
| WO | WO 98/57509 | 12/1998 |
| WO | WO 99/59358 | 11/1999 |
| WO | WO 99/59364 | 11/1999 |
| WO | WO 99/62223 | 12/1999 |

* cited by examiner

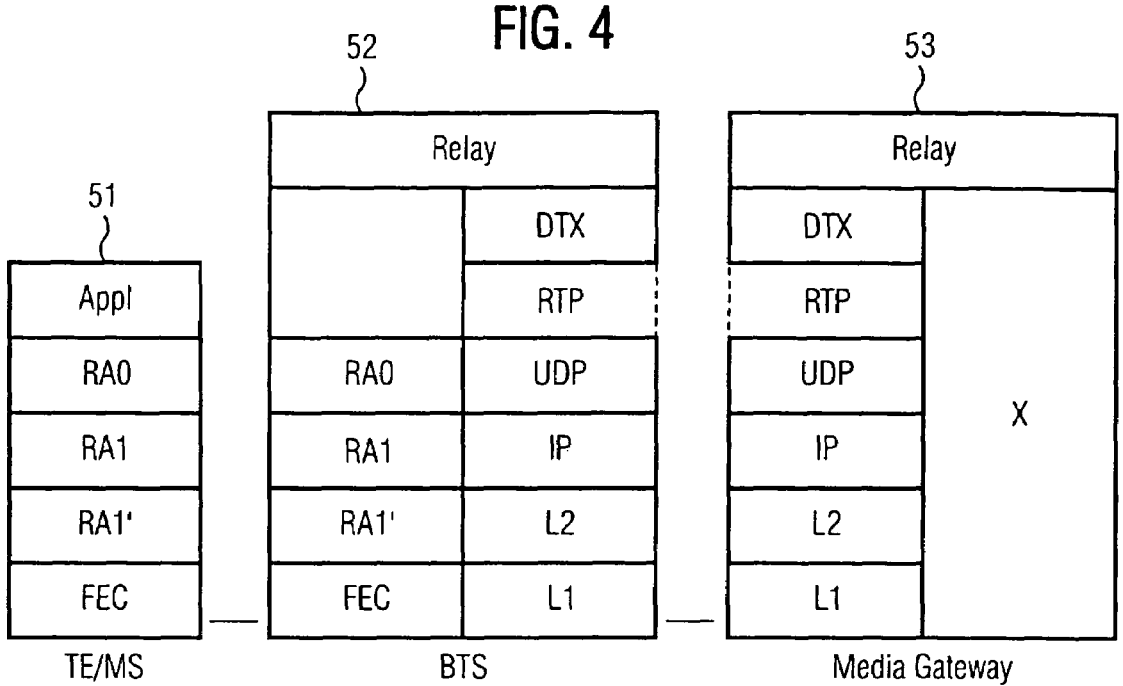
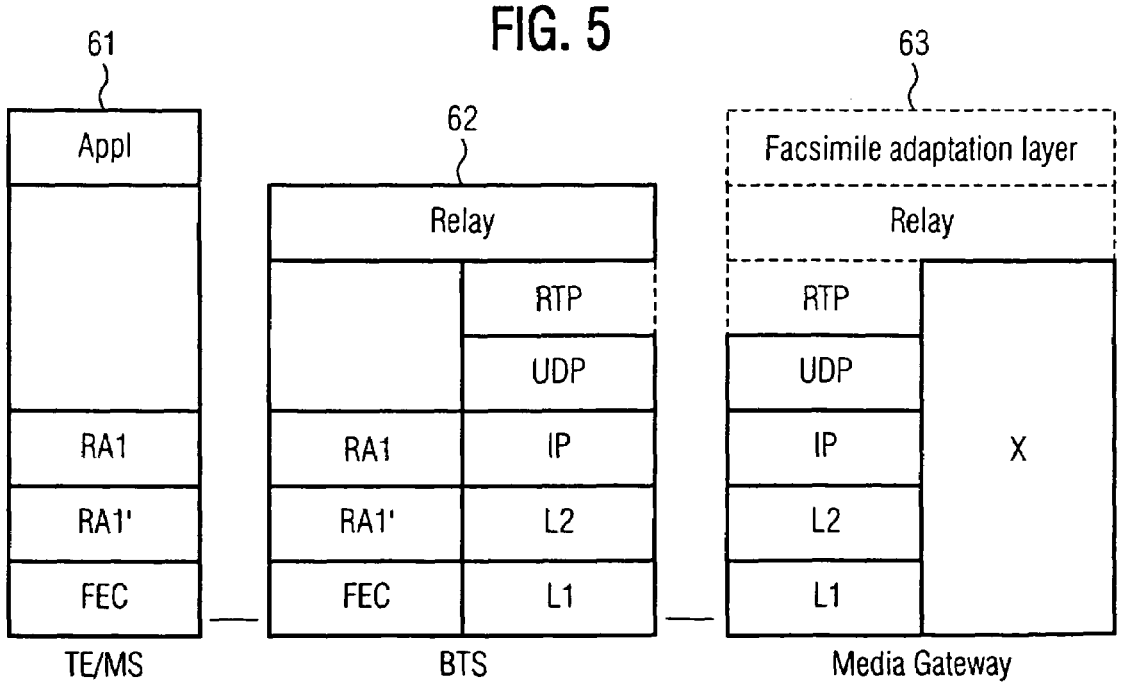

HANDLING OF CIRCUIT-SWITCHED DATA SERVICES IN IP-BASED GSM NETWORKS

FIELD OF THE INVENTION

The present invention relates to a communication network part, and a method for operating the part in a communication network.

BACKGROUND OF THE INVENTION

There have been significant attempts more recently, to couple and to integrate a mobile cellular telephone network, for instance, a GSM (Global System for Mobile Communication) network that is generally a circuit switched network to a another kind of network, known as a packet switched network, for instance, an internet protocol network or VoIP (Voice over Internet Protocol) network, wherein call information is transferred in the form of "packets" between the called member and the calling member and vice versa. The packet switched network uses several different ways or through-connections to transfer the packets between the users, whereas in the circuit switched world, for instance, the GSM network, a through-connection is established within the network and, as long as the through-connection is maintained, the whole call information including signalling and payload information is transferred via the through-connection in the circuit switched network between the users.

A through-connection in a communication network that comprises, for instance, a GSM (Global System for Mobile communication) network or a similar cellular telephone network and packet switched network being coupled with each other by interface means, is established in the conventional cellular telephone network via a base transceiver station, a base station controller and a mobile services switching centre to the interface that in turn is coupled to the internet protocol network or packet switched network.

Each node in a packet switched network which processes the payload information causes some delay in the payload transfer. Further, the transport of payload information over a combined circuit switched network with packet switched network requires high bandwidth for every allocated channel. It means that in some cases 64 kbps for every channel has to be allocated, which causes a significant waste of transmission resources. This means the known architecture of the GSM telephone network is deficient in some respects, or not very well suited for coupling to a packet switched network. The present invention intends to overcome the foregoing disadvantages of GSM networks.

BRIEF SUMMARY OF THE INVENTION

Thus it is an object of the present invention to provide a communication network part or element that has a new cellular telephone network architecture and a method for information flow in this communication network part which minimize the delay problems and bandwidth requirements.

The invention also resides in a method for operating a communication network element in a cellular telephone network which handles telephone calls and signalling information using: a radio network means; an interface for coupling the cellular telephone network to a further network, the interface means performing signalling information exchange function between the cellular telephone network and the further network, and performing user or payload information exchange function between the cellular telephone network and the further network and including a first layer for transferring signalling information assigned to a telephone call being processed in the cellular telephone network and a second layer for transferring payload information assigned to the telephone call being coupled to the interface means, wherein the method comprises the steps of: selectively generating and suppressing within the second layer an information frame comprising user information of the telephone call and being transferred to and from the interface means on a direct route assigned to the telephone call within the second layer; suppressing transfer of an information frame within the second layer if the information frame does not include any user information, and adapting a transfer rate of said payload information assigned to the telephone call within the radio network means.

As described hereinafter, advantageously, it is possible to support GSM circuit switched data services within internet protocol (IP) based GSM networks with a higher transmission efficiency than in the case of the state of the art GSM systems. Inter alia, this advantage is obtained by a discontinuous transmission (DTX) layer used in the protocol stack of the invention. The DTX layer or function integrated in a base transceiver station (BTS) makes sure that no empty frames are being sent over the link to a media gateway when the mobile station is not sending any user data. Similarly the in media gateway integrated DTX layer or function makes sure that no data is being sent to the mobile station when no data is received from a further network. By discarding these empty frames, the data rate can be improved. The data rate can be further decreased by implementation of the rate adaptation function in a radio network means, for example a base transceiver station (BTS).

Further advantageous improvements of the present invention will be apparent from the description that follows. In an embodiment of the invention, a second layer of the cellular telephone network comprises a plurality of base transceiver stations (BTS), wherein each BTS is directly connected to the interface means. In a modification, the interface means comprises media gateway means to be coupled directly to the BTS, wherein the media gateway means might comprise a frame generating means having a frame suppressing function. In a further modification, the interface means comprises a media gateway means for user information exchange between the cellular telephone network and a further network, and to be coupled directly to the BTSs.

BRIEF DESCRIPTION OF THE DRAWINGS

A more detailed understanding of the invention can be had from the following description of preferred embodiments, given by way of example and to be understood in conjunction with the accompanying drawings wherein.

DETAILED DESCRIPTION

The present invention relates to a communication network part, and a method for operating the part in a communication network. The communication network part comprises a first layer for transferring signalling information assigned to a telephone call being processed in the cellular telephone network and a second layer for transferring payload information assigned to the telephone call. Further, an interface means couples the cellular telephone network to a further network. The interface means comprises a signalling information exchange function and user or so-called payload information exchange function between the cellular telephone network and the further network. The first layer and the second layer of the cellular telephone network are coupled to the interface means. The second layer comprises information frame generating means for generating an information frame comprising user information of the telephone call and being transferred to and from the interface means on a direct route assigned to the telephone call within the second layer and a frame suppressing function for suppressing the transfer of an information frame within the second layer if the information frame does not comprise any user information. The second layer comprises also radio network means comprising a rate adaptation function for a rate adaptation of the payload information transfer assigned to the telephone call. With this step the rate adaptation function is shifted from an interworking function into a radio network means, for example base transceiver station (BTS).

Figure 1:
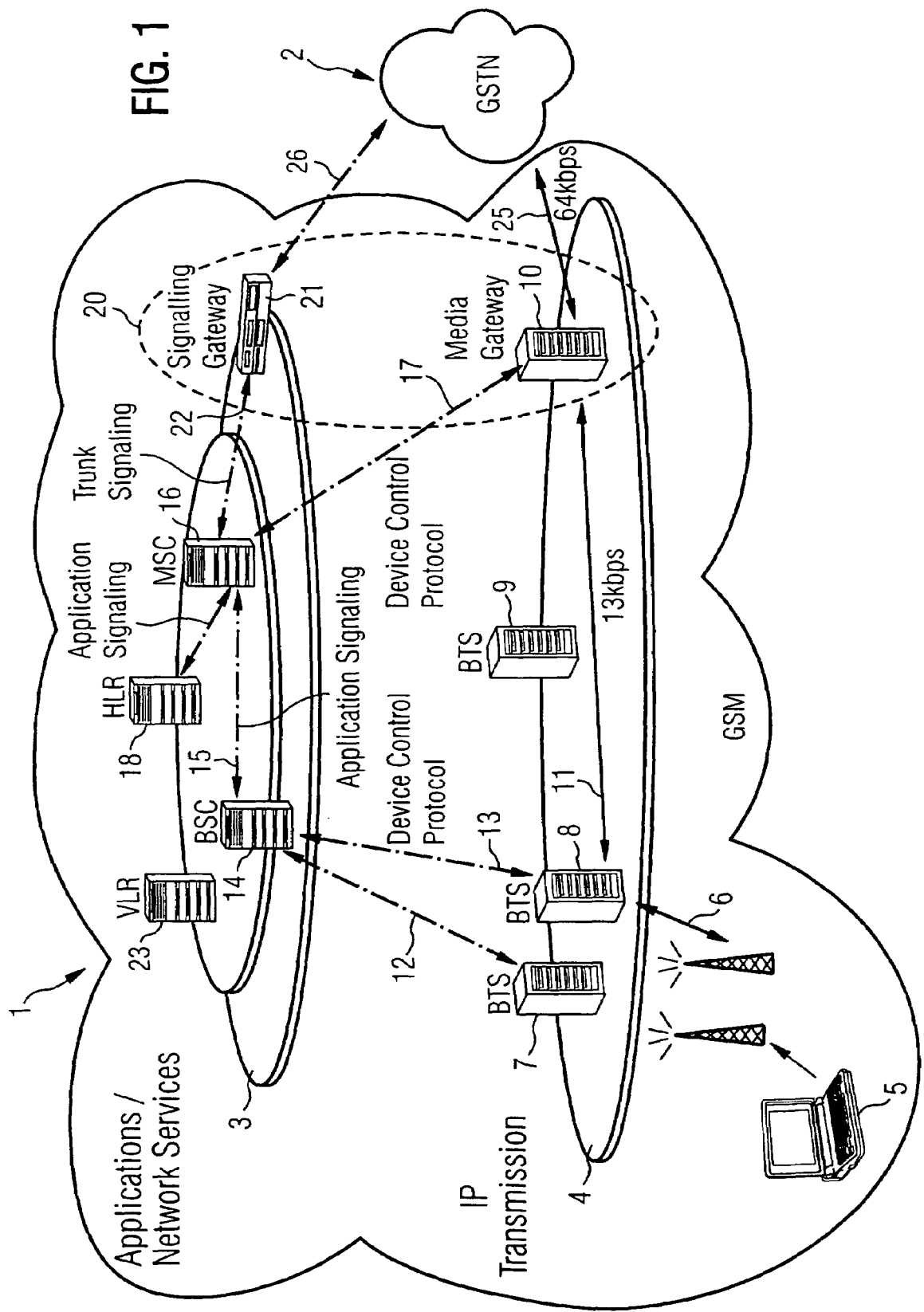
FIG. 1 a schematic block diagram of a preferred embodiment of the packet switched protocol based cellular telephone network of the present invention, e.g. a GSM network being coupled to a further network, for instance, a GSTN network, FIG. 2 a schematic block diagram of a first user plane protocol stack for asynchronous non-transparent bearer services in the cellular telephone network of FIG. 1, FIG. 3 a schematic block diagram of a second user plane protocol stack for synchronous non-transparent bearer services in the cellular telephone network of FIG. 1, FIG. 4 a schematic block diagram of a third user plane protocol stack for asynchronous transparent bearer services in the cellular telephone network of FIG. 1, FIG. 5 a schematic block diagram of a fourth user plane protocol stack for synchronous transparent bearer services in the cellular telephone network of FIG. 1, FIG. 6 a schematic block diagram of a fifth user plane protocol stack for asynchronous non-transparent high-speed circuit-switched data bearer services in the cellular telephone network of FIG. 1.

In FIG. 1 a schematic block diagram of a preferred embodiment of the packet switched protocol based cellular telephone network of the invention is shown. The cellular telephone network 1 comprises an interface 20 for coupling to a further network 2. In the following the invention is described by example using a GSM network as a cellular telephone network 1 and a GSTN network as a further network.

The cellular telephone network 1 of the invention is divided into a first layer 3 or level, also called an application or signalling information processing and transferring platform, comprising application and network service functions and into a second layer 4 or level, also called a transmission or payload information transferring platform, that performs call information transmission or payload or user information transmission and communication, for instance, in an internet protocol (IP) format. Further, interface means 20 are provided in order to couple the cellular telephone network 1 to the switched packet network for bi-directional information exchange between these networks or network parts.

The second layer 4 of the GSM network comprises several base transceiver stations BTS 7, 8 and 9 as part of a base station subsystem. Each base transceiver station 7, 8, 9 houses the radio transceivers that define a cell being assigned to a cell area and handles the radio link 6 that is the connection to a number of fixed or mobile stations 5 existing in the corresponding cell area.

As shown in FIG. 1 on the second layer 4, the base transceiver station 8 is connected by means of a direct connection or route 11, also called a through-connection, to a media gateway 10 of the interface means 20. The base transceiver station, therefore, comprises the functionality and protocol for sending and receiving call and payload or user information from or to the media gateway 10 via the direct protocol connection 11. The base transceiver station handles user data information to be sent and received over the direct protocol connection between the base transceiver station and the media gateway of the interface. Further, in order to serve the device control protocol connection 13 between the base transceiver station 8 and the base station controller 14, control protocol software is implemented on both the base transceiver station 8 and the base station controller 14 on the basis of GCP (Gateway Control Protocol) protocols, for example from ITU-T the H.248 protocol or the MGCP protocol from IETF.

The media gateway 10 substantially provides a payload conversion between the packet switched GSM network 1 and the packet switched network, for example an internet protocol network, or a circuit switched network, or the GSTN as the further network 2. The media gateway 10 of the interface means 20 comprises devices such as transcoders, modems, ISDN terminals, a network access server etc. Further, media gateway 10 comprises the functionality and control software required for transferring payload, user or call information directly to the base transceiver stations 7, 8, 9. The media gateway 10 handles user data information to be sent and received over the direct protocol connection between the media gateway 10 and a base transceiver station. On the direct connection 11 from the base transceiver station 8 to the media gateway 10, user information is transferred with a transmission rate, for instance, of 9.6 kbps. On a payload connection 25 from the media gateway 10 to the further network 2 or the internet protocol network, the transmission rate corresponds to, for instance, 64 kbps.

The first layer 3 of the GSM cellular telephone network used in the invention comprises a number of base station controllers; however, in FIG. 1, one base station controller 14 is shown in addition to, a number of mobile services switching centres, one mobile switching center 16, a home location register (HLR) 18 and a number of visitor location registers (VLR), and a single VLR 23. The home location register 18 contains all the administrative information of each subscriber registered in the GSM network along with the current VLR-location of the mobile stations 5. The visitor location register 23 contains selected administrative information from the home location register 18 necessary for call control and provision of the subscribed services for each fixed station or mobile station 5 currently located in the geographical area controlled by the visitor location register 23. The home location register 18 and the visitor location register 23 together with the mobile services switching center 16 provide the call routing and possibly international roaming capabilities of the GSM network. Additional units, for instance, an equipment identity register that contains a list of valid mobile equipment on the GSM network and an authentication centre are not shown in the figures.

The base station controller 14 and the mobile services switching centre 16 are connected via an application signalling protocol connection 15, and the mobile services switching centres 16 is also connected to the home location register 18 via an application signalling protocol connection. The application signalling protocol connection 15 is, for instance, implemented on the basis of the known MAP (Mobile Application Part) or BSSMAP (Base Station System Management Application Part) protocols.

The mobile services switching centre 16 is the main component of the layer 3 and provides all the functionality needed to handle a mobile subscriber or a mobile station 5, such as registration, authentication, location updating and call routing to a roaming subscriber. Further, in the mobile services switching center (MSC) 16, device control protocol is implemented for controlling the media gateway 10 of the interface means 20 via a MSC device control protocol connection 17 between the media gateway 10 and the mobile services switching center 16. For instance, this MSC device control protocol can be implemented in the mobile services switching center 16 on the basis of a gateway control protocol, like for example the ITU-T H.248 or the MGCP (Media Gateway Control Protocol) from ITU or the ITU MEGACOP (MEdia GAteway COntrol Protocol).

Further, on layer 3 of the GSM network a signalling gateway 21, for instance, a SS7 (Signalling System Number 7) gateway, as part of the interface means 20 is shown which, for instance, provides signalling bearer conversions between circuit or packet switched protocols and packet switched protocols or vice versa. It may also provide application level signalling conversions between different protocols. The signalling gateway 21 is connected to the further network via an interface protocol connection 26. Further, the signalling gateway 21 of the interface means 20 is connected to the mobile services switching center 16 by means of a trunk signalling protocol 22.

Figure 2:
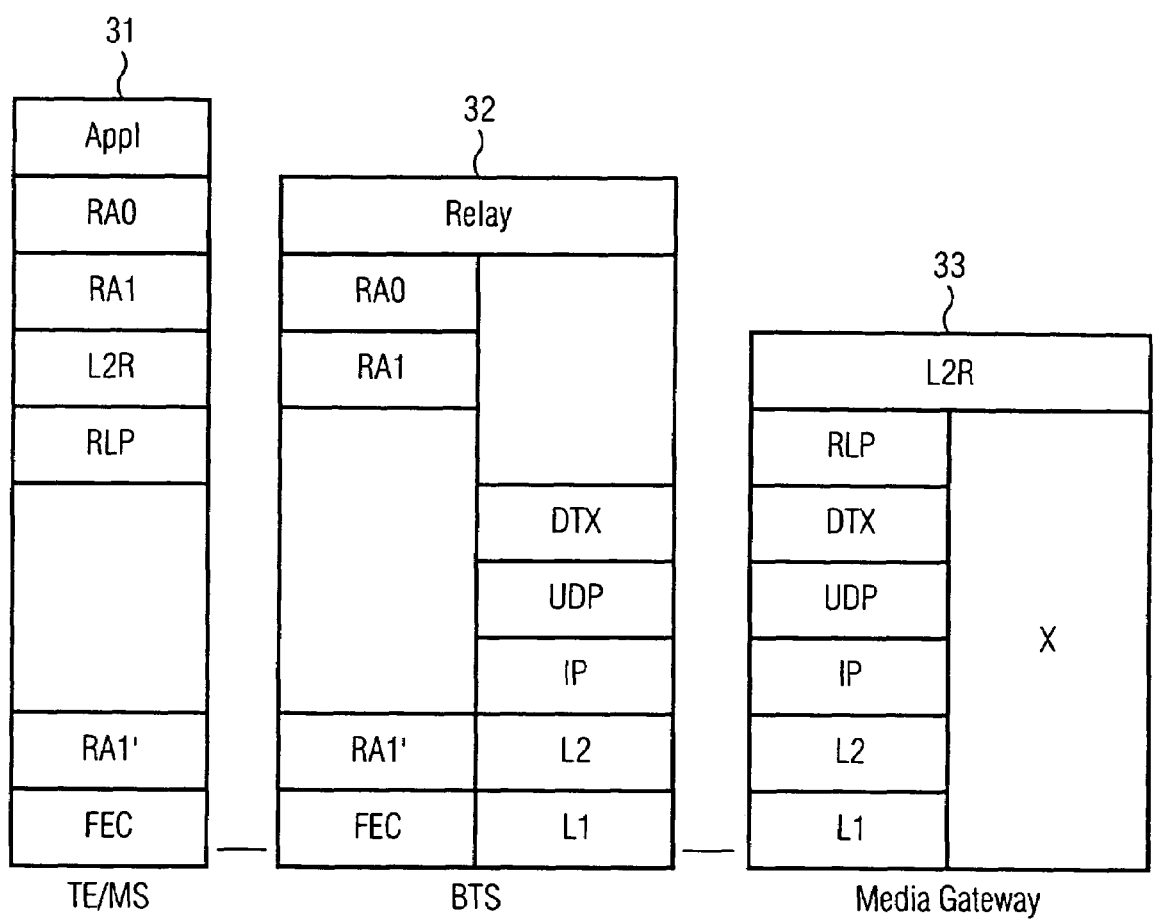

FIG. 2 shows a schematic block diagram of a first user plane protocol stack for asynchronous non-transparent bearer services in the cellular telephone network of FIG. 1.

The non-transparent bearer service means that at a layer_2 of a protocol stack, the so-called link layer, the RLP (Radio Link Protocol) is available, which guarantees a reliable data transmission. In case of transparent bearer service an unreliable data transmission is given at a layer_2, i.e., the RLP is not available on a link layer. A more detailed description for transparent and non-transparent bearer services is given below.

In case of asynchronous bearer services, the transmission of bits is not aligned on a regular time clock, whereas it is in the synchronous case. A protocol for asynchronous transmission, groups the bits in units for example of 7 to 9 bits, so-called characters, whereby a character is preceded and followed by special signals, the so-called start and the stop bits. In the synchronous case, bits are transmitted regularly and continuously on the basis of a time clock. In more detail, FIG. 2 shows, in connection with FIG. 1, a first protocol stack 31 being implemented in the mobile station TE/MS, a second protocol stack 32 being implemented in the base transceiver station BTS and a third protocol stack 33 being implemented in the media gateway Media Gateway.

The first to third protocol stacks 31, 32 and 33 are established to provide the transmission of user data. According to FIG. 1 the transmission of user data is performed within the transmission layer 4 or user plane, for example from the mobile station 5 or user or end terminal via the radio link 6, the base transceiver station 8 and the direct connection 11 to the media gateway 10 and vice versa, i.e., from the media gateway 10 via the direct connection 11, the base transceiver station 8 and the radio link 6 to the mobile station 5 or user end terminal. A data transmission from the mobile station 5 to the media gateway 10 is called an uplink transmission whereas a data transmission that is performed in the opposite direction, i.e. from the media gateway 10 to the mobile station 5, is called a downlink transmission.

The first protocol stack 31 of FIG. 2 implemented in the mobile station TE/MS comprises a sequence of protocol functions, which a user data stream has to pass from or to an application layer that is a source of user data in uplink transmission and a drain of user data or user information in downlink transmission. The protocol function sequence of the uplink transmission in the first stack 31 comprises an application layer Appl, an RA0 function, an RA1 function, an L2R function, an RLP function an RA1' function and a forward error correction (FEC) function in this order, wherein the data stream output from the FEC function is transferred via the radio link to the base transceiver station BTS. In this regard, it should be remarked that the expressions "layer", "protocol" each represent an equivalent meaning for "function" used here and in the following description.

In the following, the case of uplink data transmission within the mobile station TE/MS is described in more detail.

The RA0 function converts an incoming asynchronous user data stream that is output from the application layer to a synchronous data stream. For instance, the RA0 function converts the incoming asynchronous data stream having a user data rate of 9.6 kbps into a synchronous data stream having a user data rate of 9.6 kbps. A more detailed description of the RA0 function is disclosed for example, in GSM 04.21 "Digital cellular telecommunications system (Phase 2+); Rate adaption on the mobile Station—Base Station System (MS—BSS) Interface (GSM 04.21 version 5.2.1)" published by the European Telecommunications Standards Institute (ETSI) in 1998 (in the following referred to as "GSM 04.21"). The synchronous data stream resulting from the RA0 function is fed to the RA1 function.

The RA1 function converts the incoming synchronous user data stream to a synchronous data stream having a data rate higher than the incoming data rate. For instance, the RA1 function converts the incoming synchronous data stream having the user data rate of 9.6 kbps into a synchronous data stream having an intermediate user data rate of 16 kbps. A detailed description of the RA1 function is disclosed again in the GSM 04.21 paper, pp. 11 to 14. The synchronous data stream resulting from the RA1 function is fed to the L2R-function.

The Layer_2 Relay (L2R) function converts the incoming synchronous user data stream that is output from the RA1 function to a data stream that can be processed by the Radio Link Protocol RLP function. In general the L2R fulfils some tasks of the link layer protocol. In particular the L2R is responsible for flow control and buffering of packets. The first mechanism is used to control the transmission rate at which a node injects packets into a network to avoid congestion either on the transmission link or at the receiver. The second method allows a buffering of the copies of the sent packets in order of a possible retransmission in case an error occurs during a transmission. A more detailed description of the L2R function is disclosed, for example, in "Digital cellular telecommunications system (Phase 2+); Radio Link Protocol (RLP) for data and telematic services on the Mobile Station—Base Station System (MS—BSS) interface and the Base Station system—Mobile-services Switching Centre (BSS—MSC) interface (GSM 04.22 version 7.0.0 release 1998)" Mobile Station—Base Station System (MS—BSS) Interface (GSM 04.22 version 5.2.1)" published by the European Telecommunications Standards Institute (ETSI) (in the following referred to as "GSM 04.22"). The data stream resulting from the L2R function is fed to the RLP function.

The task of the Radio Link Protocol (RLP) layer is detection and correction of the failed transmitted packets to ensure reliability of the transmission. This task is realized by applying a single fundamental technique known as positive acknowledgment with retransmission. The technique requires a recipient sending back an acknowledgment to the sender as it receives data. The sender keeps a copy of each packet it sends as this is done on the L2R layer, and waits for an acknowledgment before sending the following packet or data stream. The RLP on the sender side also starts a timer when it sends a packet. In case the timer expires before an acknowledgment arrives or in case that sender receives an acknowledgment message requiring sending a packet anew, this causes the assumption on the sender side that the packet was lost and a retransmission is started. A retransmission of a packet performs the correction of the error.

The RLP function processes the incoming data stream into RLP frames that are sent in strict alignment with the radio transmission data. Generally, an RLP frame is a sequence of contiguous bits representing an RLP procedural element. The generated RLP frames are of a fixed size of, for instance, 240 bits or 576 bits. Whenever an RLP frame is to be sent, the RLP function or RLP entity has to provide the necessary protocol information to be contained in it. There are different types of RLP frames, for example a so-called I+S frame that is used for user information transfer and that carries supervisory information in a piggybacked manner, an S frame that contains supervisory information in the absence of user data information and a U frame that contains unnumbered protocol information. The basic frame structure of an RLP frame comprises a header, for example 16 or 24 bit transferring control information, an information field, for example 200, 192, 536 or 528 bit and a frame check sequence (FSC), for example 24 bit that is a field of redundant information based on a cyclic code and being used for error detection, in this order.

The header or header format of the S frame, inter alia, contains information for specifying the S frame. For instance, a "011111" word carried in the bits with the bit number 4 to 9 of the header specifies the frame to be an S frame. Further, the header of the S frame comprises a receive sequence number N(R) field. The number N(R) designates the next information frame to be sent by the other RLP entity. The N(R) number is, for instance, 6 bit (version 0 and 1 frames) or 9 bit (version 2 frames) long and it occupies the 11th to 16th bit (version 0 and 1 frames) or the 14th to 22nd bit (version 2 frames) of the header. The bit 24 position of the header (only version 2 headers) can be occupied by an upgrading proposal bit (UP bit) that may be used by the inter working function that, for instance, can be established in the interface means 20, particularly in the media gateway 10 for constituting the interface to the further network 2 shown in FIG. 1, to indicate to the mobile station 5 that a service level upgrading will increase the throughput. A more detailed description of the RLP entity and of the RLP frames is seen in the GSM 04.22 document and the specifications mentioned therein.

Subsequent to the RLP entity or protocol layer the stack 31 of the mobile station TE/MS has RA1' converter or function. The RA1' function converts the incoming user data stream that is output from the RLP function to a synchronous data stream having a data rate being lower than the incoming data rate. For instance, the RA1' function converts the incoming synchronous data stream having the RLP data rate or intermediate data rate of 16 kbps into a synchronous data stream having a radio interface rate or user data rate of 12 kbps. A detailed description of the RA1' function is disclosed again in the GSM 04.21 paper. The synchronous data stream resulting from the RA1' function is fed to the forward error correction (FEC) function.

The FEC function provides a forward error correction of the data stream received from the RAP converter and adds corresponding redundant information for error correction t the RA1' data stream. Therefore, the FEC function increases the incoming RA1' data rate, for instance, from 12 kbps to 22.8 kbps. The data stream output from the FEC function is forwarded via the radio link to the second protocol stack 32. A detailed description can be found in ETSI 05.08 and ETSI 05.38.

In the following, the case of downlink data transmission within the user end terminal or the mobile station TE/MS is described in more detail. In the direction of the downlink transmission, the sequence of the first protocol stack 31 in the mobile station TE/MS comprises the FEC function, the RA1' function, the RLP function, the L2R function, the RA1 function and the RA0 function in this order wherein the data stream output from the RA0 function is input to the application layer.

First, the FEC function of the first stack 31 terminates the forward error correction of the synchronous data stream received via the radio link from the second stack 32 of the base transceiver station BTS. It processes and reduces or eliminates the redundant information for error correction in order to output a synchronous data stream prepared for processing in the RA1' function. Therefore, the FEC function decreases the incoming data rate, for instance, from 22.8 kbps to 12 kbps. The data stream output from the FEC function is input to the RA1' function of the first stack 31.

Subsequently, the RA1' function of the protocol stack 31 of the mobile station TE/MS converts the incoming synchronous data stream that is output from the FEC function to a synchronous data stream having a data rate being higher than the incoming data rate. For instance, the RA1' function converts the incoming synchronous data stream having the radio interface data rate of 12 kbps into a synchronous data stream having a intermediate data rate of 16 kbps. Again, a detailed description of the RA1' function is disclosed in the GSM 04.21 paper. The synchronous data stream resulting from the RA1' function is fed to the RLP function or RLP entity in the mobile station TE/MS.

The RLP function processes the incoming data stream that is in the above described format of RLP frames and prepares a data stream to be processed in the subsequent L2R layer.

The Layer_2 Relay (L2R) function converts the incoming synchronous user data stream that is output from the RLP function to a synchronous data stream that can be processed in the subsequent RA1 function, i.e. also the L2R layer is terminated in the first stack 31 of the mobile station TE/MS in downlink transmission of data.

The subsequent RA1 function converts the incoming synchronous user data stream that is output from the L2R function to a synchronous data stream having a data rate being lower than the incoming data rate. For instance, the RA1 function converts the incoming synchronous data stream having the intermediate data rate of 16 kbps into a synchronous data stream having the user data rate of 9.6 kbps. The synchronous data stream resulting from the RA1 function is fed to the RA0 function.

The RA0 function converts the incoming synchronous user data stream that is output from the RA1 function to the asynchronous data stream. For instance, the RA0 function converts the incoming synchronous data stream having the user data rate of 9.6 kbps into the asynchronous data stream having the user data rate of 9.6 kbps. The asynchronous data stream resulting from the RA0 function is fed to the application layer Appl which acts as a drain for the asynchronous user data.

The second protocol stack 32 shown in FIG. 2 which is implemented in the base station transceiver BTS comprises a sequence of protocol functions, a user data stream has to pass through.

The protocol function sequence in the direction of uplink transmission in the protocol stack 32 comprises the above described FEC function, the RA1' function, the Ra0 function, a Relay function, a discontinuous transmission DTX function, a user datagram protocol UDP function, an internet protocol IP function, a Layer_2 L2 function and a Layer_1 L1 function in this order wherein the data stream output from the L1 function is transferred via the direct connection 11 to the media gateway 10, according to FIG. 1.

In the following, the case of uplink data transmission within the second stack 32 of the base transceiver station BTS is described in more detail.

First, the FEC function of the second stack 32 terminates the forward error correction of the synchronous data stream received via the radio link from the first stack 31 of the mobile station TE/MS. It processes and reduces or eliminates the redundant information for error correction in order to output a synchronous data stream prepared for processing in the RA1' function. Therefore, the FEC function decreases the incoming data rate, for instance, from 22.8 kbps to 12 kbps. The data stream output from the FEC function is input to the RA1' function of the second stack 32.

Subsequently, the RA1' function of the second stack 32 the base transceiver station BTS converts the incoming synchronous data stream that is output from the FEC function to a synchronous data stream having a data rate being higher than the incoming data rate. For instance, RA1' function converts the incoming synchronous data stream having the radio interface data rate of 12 kbps into a synchronous data stream having the intermediate data rate of 16 kbps. For a detailed description of the RA1' function reference may be had to the GSM 04.21 paper. The synchronous data stream resulting from the RA1' function is fed to the RA1 function in the base transceiver station BTS.

The subsequent RA1 function converts the incoming synchronous user data stream that is output from the RA1' function to the synchronous data stream having a data rate being lower than the incoming data rate. For instance, the RA1 function converts the incoming synchronous data stream having the intermediate data rate of 16 kbps into a synchronous data stream having the user data rate of 9.6 kbps. The synchronous data stream resulting from the RA1 function is fed to the RA0 function, which converts the incoming synchronous user data stream that is output from the RA1 function to the asynchronous data stream. The asynchronous data stream is relayed Relay to the DTX function.

The DTX function performs a frame suppression or discarding function for suppressing the transfer of an information frame generated in the RLP layer or entity in the first stack 31 or in the third stack 33 of the media gateway 10 within the second layer 4, as shown in FIG. 1, if the RLP information frame does not comprise any user information. The DTX function detects the frame not comprising any user information on the basis of information specifying that the information frame does not provide any user information. The DTX function, for instance, detects the "011111" word in the header of the current information frame which, therefore, is an S frame that does not contain any user or payload information. In case the DTX function detects an S frame, the DTX function then verifies the receive sequence number N(R) field of the header of the detected S frame. If the DTX function in the base station transceiver BTS receives an S frame and the N(R) of the current S frame is equal to the previous frame or S frame then the DTX function discards or suppresses this current S frame from further transmission in order to decrease the data rate. The data stream output from the DTX layer is input to the following user data protocol (UDP) function.

The UDP function provides a procedure for converting the synchronous data stream output from the DTX function into a data stream prepared for the subsequent IP function within the second stack 32 of the base transceiver station BTS. The UDP header format comprises, inter alia, a source port field and a destination port field. The destination port field is loaded with address information assigned to the media gateway and the source port field is loaded with address information assigned to the base transceiver station BTS. A more detailed description of the UDP function used in this network is published in "User Datagram Protocol" by J. Postel in RFC 768 (http://www.ietf.cnri.reston.va.us/rfc/rfc0768.txt), 1980, and in the documents mentioned therein.

The data stream output from the UDP function is input to the IP function in the second stack 32 of the base transceiver station BTS. The IP function, inter alia, is designed for use in interconnection of the base transceiver station BTS and the media gateway for packet switched communication and data transmission between them. The IP function provides for transmitting blocks of data called datagrams that are output from the UDP function, from the base transceiver station BTS as source to the media gateway as destination. A detailed description of the IP function is published in "DOD Standard Internet Protocol", RFC 760, IEN 128, 1980 (http://www.ietf.cnri.reston.va.us/rfc/rfc0760.txt). The resulting data stream output has a data rate between 0 and 15 kbps.

The IP function in the second stack 32 of FIG. 2 outputs the datagrams to a Layer_2 L2, which function fulfils for example ATM (Asynchronous Transfer Mode). The SDH/SONET (Synchronous Digital Hierarchy/Synchronous Optical Network) is an example for a protocol of a Layer_1 L1, which processes and prepares data received from layer L2 for sending to the media gateway 10 via the direct route or connection 11, according to FIG. 1.

In the following, the case of downlink data transmission within the second stack 32 of the base transceiver station BTS is described in more detail.

In the direction of the downlink transmission, the sequence of functions of the second protocol stack 32 in the base transceiver station BTS comprises the Layer_2 L2 function, the Layer_1 L1 function, the IP function, the UDP function, the DTX function, the Relay function, the RA0 function, the RA1 function, the RA1' function and the FEC function in this order, wherein the data stream output from the FEC function of the second stack 32 is input to FEC function of the first stack 31 of the mobile station TE/MS.

First, the data stream or datagrams, which are fed from the L1 function of the third stack 33 in the media gateway Media Gateway via the direct connection 11 in the downlink direction to the L1 function in the second stack 32 of the base transceiver station BTS, are processed and prepared in the L1 and L2 function of the second stack for further processing in the subsequent IP function, which is terminated in the second stack 32 in downlink direction. The datagrams resulting from the IP layer are output to the UDP function.

The UDP function provides a procedure for converting the datagrams received from the IP function into a synchronous data stream to be output to the DTX function. In this example the UDP function is terminated in the second stack 32 of the base transceiver station.

The DTX function performs the same function as already explained with regard to the DTX function in uplink direction. But in downlink transmission the DTX function of the second stack 32 can be inactive since all superfluous information RLP frames in downlink direction have been already discarded or filtered out in a further DTX function implemented in the third stack 33 of the media gateway, which is described later.

The subsequent RA0 function converts the incoming asynchronous user data stream, relayed from the DTX function, to the synchronous data stream. The synchronous data stream is fed to the RA1 function, which converts the incoming synchronous user data stream to the synchronous data stream having a data rate higher than the incoming data rate. For instance, the RA1 function converts the incoming synchronous data stream having the data rate of 9.6 kbps into a synchronous data stream having the intermediate data rate of 16 kbps. The synchronous data stream resulting from the RA1 function is fed to the RA1' function of the second protocol stack 32.

Subsequently, the RA1' function of the protocol stack 32 of the base transceiver station BTS converts the incoming synchronous data stream that is output from the RA1 function to a synchronous data stream having a data rate lower than the incoming data rate. For instance, the RA1' function converts the incoming synchronous data stream having the intermediate data rate of 16 kbps into a synchronous data stream having the radio frequency data rate of 12 kbps. The synchronous data stream resulting from the RA1' function is fed to the FEC function in the base transceiver station BTS.

The FEC function of the second stack 32 in downlink direction provides a forward error correction of the data stream received from the RA1' converter and adds corresponding redundant information for error correction to the RA1' data stream. Therefore, the FEC function increases the incoming RA1' data rate, for instance, from 16 kbps to 22.8 kbps. The data stream output from the FEC function is forwarded via the radio link to the first stack 31 of the mobile station TE/MS.

The third protocol stack 33 shown in FIG. 2 which is implemented in the Media Gateway comprises a sequence of protocol functions, which a user data stream has to pass through.

The protocol function sequence in the direction of uplink transmission in the protocol stack 33 comprises the above described L1 function, L2 function, IP function, the UDP function, the DTX function, the RLP function, a L2R function and a X function in this order, wherein the data stream output from the X protocol stack is sent to the further network 2. The term X protocol stack represents a general description for a fixed network protocol stack implemented in the media gateway, which structure differs in dependence on the configuration of the further network. The fixed network protocol stack could be, for instance, a modem stack, an ISDN digital data stack or an access server protocol stack providing a data stream with a data rate of 64 kbps. As shown in FIG. 2, the X protocol stack receives the data stream prepared by the L2R function and provides an output data stream to the further network 2.

In the following description, the case of uplink data transmission within the third stack 33 of the media gateway Media Gateway is described in more detail, with reference to FIG. 1.

First, the data stream or datagrams, which are fed from the L1 function of the second stack 32 in the base transceiver station 8 via the direct connection 11 in the uplink direction to the L1 function in the third stack 33 of the media gateway, are processed and prepared in the L1 and L2 function of the third stack for further processing in the subsequent IP function. The resulting datagrams of IP function are output to the UDP function.

The subsequent UDP function provides a procedure for converting the datagrams received from the IP function into a synchronous data stream to be output to the DTX function, i.e., the UDP function is terminated in the third stack 33 of the media gateway.

The following DTX function performs the same function as already explained with regard to the DTX function in uplink direction of the second stack 32 in the base transceiver station BTS. But in uplink transmission, the DTX function of the third stack 33 can be set inactive since all superfluous information RLP frames in uplink direction have been already discarded or filtered out in the DTX function implemented in the second stack 32 of the base transceiver station BTS.

The subsequent RLP function processes the incoming data stream that is in the above described format of RLP frames and prepares a data stream to be processed in the subsequent L2R layer. Within this example the RLP layer is terminated in the third stack 33 of the media gateway inuplink transmission of data.

The L2R function converts the incoming synchronous user data stream that is output from the terminated RLP function to a synchronous data stream that can be processed in the subsequent X protocol stack. The L2R layer is terminated in the third stack 33 of the media gateway in uplink transmission of data.

In the following, the case of downlink data transmission within the third stack 33 of the media gateway Media Gateway is described in more detail.

In the direction of downlink transmission, the sequence of the third protocol stack 33 in the media gateway comprises the X protocol stack, the L2R function, the RLP function, the DTX function, the UDP function, the IP function, the L2 function and the L1 function in this order, wherein the data stream output from the L1 function of the third stack 33 is input to the L1 function of the second stack 32 of the base transceiver station BTS in the case of downlink transmission.

First, in the downlink direction, the X protocol stack representing the fixed network protocol stack receives the data stream from the further network 2 and prepares and converts the received data stream or user information stream to an synchronous data stream to be processed in the subsequent L2R function. The fixed network protocol stack provides, for instance, a data stream of 9.6 kbps from the input ISDN data stream of 64 kbps.

The Layer_2 Relay L2R function, then, converts the incoming synchronous user data stream that is output from the X protocol stack to a data stream that can be processed by the RLP function or entity in the third protocol stack 33. A more detailed description of the L2R function is disclosed in GSM 04.22. The data stream resulting from L2R function is fed to the subsequent RLP (radio link protocol) function.

The RLP function processes the incoming data stream into RLP frames that are sent in strict alignment with the radio transmission data. The function and the structure of the RLP frames is the same as already explained with regard to the RLP layer in the first stack 31 in the mobile station TE/MS.

The subsequent DTX function performs a frame suppression or discarding function for suppressing the transfer of an information frame generated in the RLP layer or entity in the third stack 33 of the media gateway within the second layer if the RLP information frame does not comprise any user information. The procedure and structure of the DTX function in the third stack 33 is the same as already explained with regard to the DTX function implemented in the second stack 32 of the base transceiver station BTS. The data stream output from the DTX layer is input to the following UDP function.

The UDP function provides the procedure for converting the synchronous data stream output from the DTX function into a data stream prepared for the subsequent IP function within the third stack 33 of the media gateway. Again, the UDP header format comprises, inter alia, a source port field and a destination port field. The destination port field is loaded with address information assigned to the base transceiver station BTS and the source port field is loaded with address information assigned to the media gateway.

The data stream output from the UDP function is input to the IP function in the third stack 33 of the media gateway.

The IP function, inter alia, is designed for use in interconnection of the base transceiver station BTS and the media gateway Media Gateway for packet switched communication and data transmission between them. Again, but in downlink direction within the third stack 33, the IP function provides for transmitting blocks of data called datagrams, that are output from the UDP function, from the media gateway Media Gateway as source to the base transceiver station BTS as destination. The IP function in the third stack 33 of FIG. 2 outputs the datagrams to layer L2, which processes the datagrams and releases the prepared data to Layer_1 L1. L1 is responsible for preparing the data stream to be sent to the base transceiver station BTS via the direct route or connection 11. The resulting data stream output in downlink direction has, for instance, the data rate of 9.6 kbps or 13 kbps.

Figure 3:
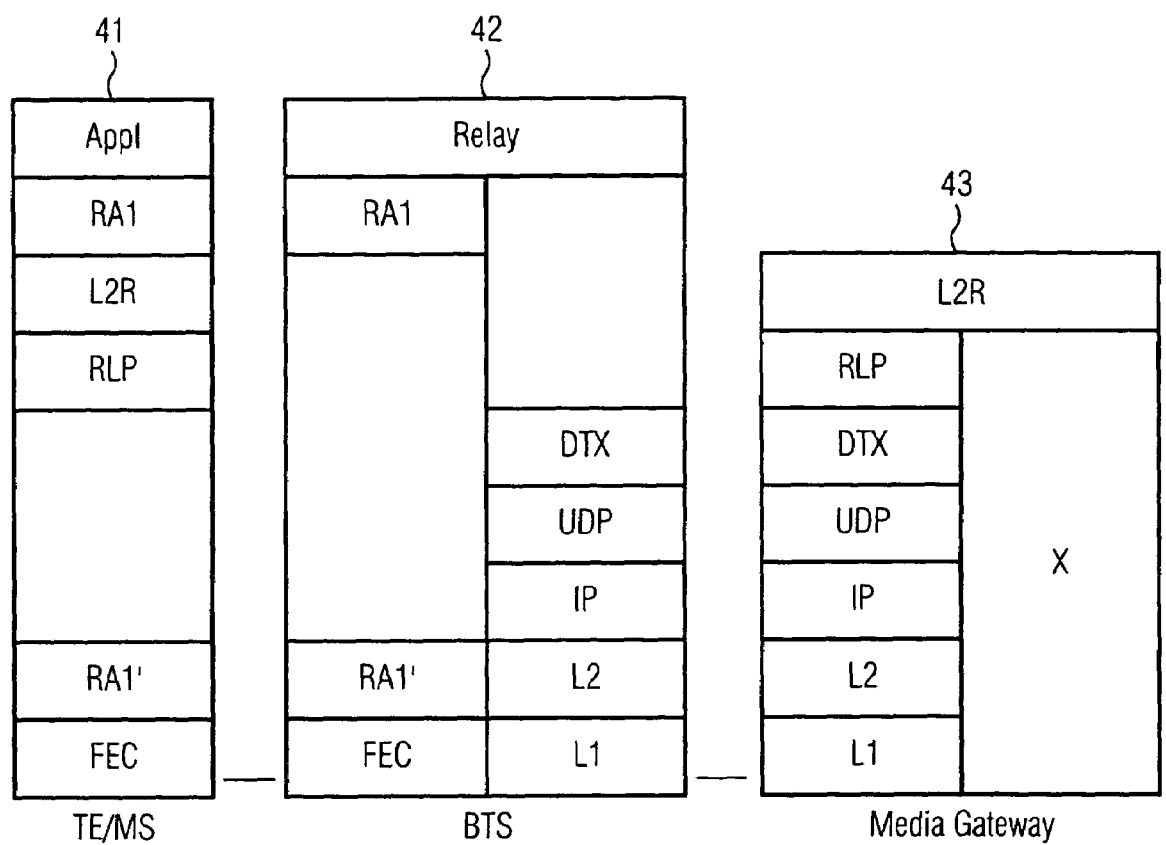

FIG. 3 illustrates a schematic block diagram of a second user plane protocol stack for synchronous non-transparent bearer services in the cellular telephone network of FIG. 1. FIG. 3 shows a first protocol stack 41 being implemented in the mobile station TE/MS, a second protocol stack 42 being implemented in the base transceiver station BTS and a third protocol stack 43 being implemented in the media gateway Media Gateway. The first to third protocol stacks 41, 42 and 43, that constitute together the second user plane protocol stack, are again established to provide the transmission of user data.

Since the procedure of downlink and uplink direction in case of synchronous non-transparent bearer services is similar to the above described procedure of downlink and uplink for asynchronous non-transparent bearer services, in the description that follows, it will not be treated in every detail. The significant difference between these two user planes consists in the removal of the RA0 layer in the first protocol stack 41 implemented in the mobile station. This is done because of the fact that the application layer already delivers synchronous data whereby there is no need of data transformation done by RA0 function.

FIG. 4 is a schematic block diagram of a third user plane protocol stack for asynchronous transparent bearer services in the cellular telephone network of FIG. 1.

This user plane includes also three protocol stacks implemented in the corresponding network entities. A first protocol stack 51 is being implemented in the mobile station TE/MS, a second protocol stack 52 is being implemented in the base transceiver station BTS and a third protocol stack 53 is being implemented in the media gateway Media Gateway. The whole procedure of the data transmission in uplink or downlink direction is to be based on the user plane protocol stack for asynchronous non-transparent bearer services described in the context of FIG. 2. In the following, the significant differences from the described example pertaining to FIG. 2 will be presented.

As already explained a transparent bearer service does not guarantee a reliable data transmission at the level of the link layer. In other words, no L2R and no RLP functions are supported for this kind of data transmission. With regard to the protocol stack 51 of FIG. 4 implemented in the mobile station TE/MS, the sequence of the protocol functions does not comprise the L2R and RLP layer.

The transparent bearer service is applied for example in applications transmitting real-time data such as audio or video. The RLP function unavailable in the transparent bearer service causes a faster transport of data due to the fact that the occurred errors are not corrected via a retransmission. This kind of data transmission is allowed by applications such as audio or video, which tolerate some error rate. The missing RLP function leads yet to a problem that no guarantee is given for the right order of the received packets. The UDP as transport protocol allocated directly above a network layer, for example Internet Protocol IP, is a typical unreliable transport protocol of real-time application, which also does not take care for reordering of the received data packets which are not in the sent order. Therefore in order to take care of reordering the packets or of the time-critical issues, a so-called real-time protocol can be introduced above the UDP. The real-time protocol can be implemented for example by the Real Time Protocol RTP or any other mechanism providing similar functionality. In the second protocol stack 52 and in the third protocol stack 53 shown in FIG. 4, an RTP layer is being implemented as an example for a real-time protocol. Detailed information on the RTP function is described in the publication, "RTP: A Transport Protocol for Real-Time Applications" published by H. Schulzrinne, et al in 1996 (http://www.ietf.cnri.reston.va.us/rfc/-rfc0760.txt).

Since there is no RLP layer and therefore no RLP frames, a discontinuous transmission function DTX shown in FIG. 4 is different from a DTX function shown in FIG. 2 or FIG. 3. The DTX function of the second stack 52 can be implemented as follows. The RA0 layer which is implemented in the interworking function in the GSM network should be moved to the base transceiver station BTS. In that case, the media gateway would relay any asynchronous data stream received from the fixed network side to the base transceiver station BTS. The base transceiver station BTS would terminate the RA0 function to yield a synchronous stream to be sent to the mobile station TE/MS. This enables the media gateway to omit any empty frames. If the base transceiver station BTS has not received any data from the interworking function to forward to the mobile station TE/MS, the base transceiver station BTS generates empty frames. The described case occurs in the uplink direction. In the downlink direction, the DTX function of the second protocol stack 52 can be inactive since all empty or superfluous information frames have been already discarded or filtered out in a further DTX function implemented in the third protocol stack 53 of the media gateway.

Also, a DTX function implemented in the third protocol stack 53 of the media gateway shown in FIG. 4 performs a frame suppression or discarding function for suppressing the transfer of an information frame which does not comprise any user information or is empty. The procedure and structure of the DTX function in the third stack 53 can be the same as already explained with regard to the DTX function implemented in the second stack 52 of the base transceiver station BTS. But in uplink transmission, the DTX function of the third stack 53 can be set inactive since all empty information frames in uplink direction have been already discarded or filtered out in the DTX function implemented in the second stack 52 of the base transceiver station BTS.

FIG. 5 is a schematic block diagram of a fourth user plane protocol stack for synchronous transparent bearer services in the cellular telephone network of FIG. 1.

FIG. 5 shows a first protocol stack 61 being implemented in the mobile station TE/MS, a second protocol stack 62 being implemented in the base transceiver station BTS and a third protocol stack 63 being implemented in the media gateway Media Gateway. Among these three protocol stacks a transmission of user data is performed. Within the considered user plane a transmission of synchronous bearer services is carried out. This means an application already delivers a synchronous data flow, therefore a RA0 function is not required any more. Further the data transmission is transparent, which means that a RLP function is not available.

Since within the user plane protocol stack for synchronous transparent bearer services, no RLP frames are existing as a RA0 function is not available, the frame suppression procedure or discarding function for suppressing the transfer of an information frame which does not comprise any user information is empty or can not be performed. This kind of bearer services can be used for transport of a facsimile service, as it is done in this example with regard to FIG. 5. Within the third protocol 63 a supplementary layer, a so-called facsimile adaptation layer is implemented. This layer performs converting of the facsimile data between the circuit switched network and a further network.

The whole procedure for data transmission in uplink and downlink direction is to be performed in a similar way as it is described and explained in the example of asynchronous non-transparent bearer services.

Figure 6:
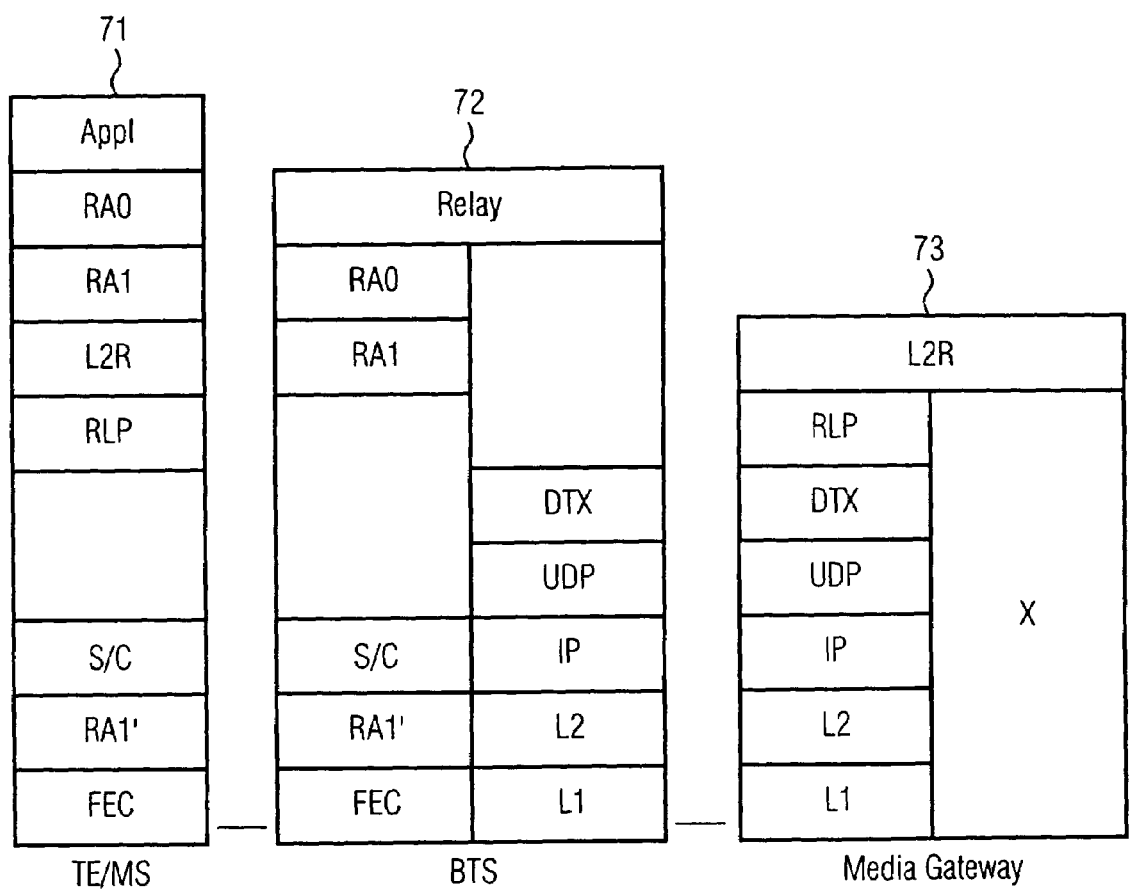

FIG. 6 is a schematic block diagram of a fifth user plane protocol stack for asynchronous non-transparent high-speed circuit-switched data bearer services in the cellular telephone network of FIG. 1.

FIG. 6 shows a first protocol stack 71 being implemented in the mobile station TE/MS, a second protocol stack 72 being implemented in the base transceiver station BTS and a third protocol stack 73 being implemented in the media gateway Media Gateway. The first, second and third stacks 71, 72 and 73 are established to provide the transmission of user data.

The considered user plane provides a solution for High Speed Circuit Switched Data service (HSCSD) as an example of so-called enhanced GSM data service. With HSCSD it is possible to transfer data with higher bandwidth, exactly with the performance of 4*9.6 kbit/sec or 4*14.4 kbit/sec. A detailed description of HSCSD can be found in GSM 02.34 and GSM 03.34.

As a basis for explaining the transport of HSCSD, an example of asynchronous non-transparent bearer services has been chosen. Every other user plane can be adapted to the HSCSD in a similar way.

In comparison with FIG. 1 an additional layer for communication over a radio link in the mobile station MS and in the corresponding protocol stack in the base transceiver station BTS is introduced, i.e., a so-called SIC (Split/Combine) layer. The task of the SIC function is to split the output of the higher layer into multiple channels each 9.6 kbit/sec or 14.4 kbit/sec and to combine the output of the lower layer into one data flow of a higher layer. In the first protocol stack 71 of FIG. 6 a SIC layer splits the data coming from RLP layer with the bitrate between 9.6 kbit/sec and 57.6 kbit/sec into 4 channels and in the uplink direction the SIC combines the data coming from RA1' into one RLP data flow. A similar converting procedure is done in the second protocol stack 72 of FIG. 6 between a RA1' and RA1 layer.

The complete data transmission in uplink and downlink direction between a mobile station and a further network is comparable with the data transmission described in FIG. 1.

EQUIVALENTS

Although preferred embodiments of the method and apparatus of the present invention have been illustrated in the accompanying drawings as described in the foregoing detailed description, it will be understood that the invention is not limited to the embodiments disclosed, but is capable of numerous rearrangements, modifications, equivalents and substitutions without departing from the scope of the invention as set forth in the appended claims.

What is claimed is:

1. A method for data transmission between a circuit switched network, via an interface means that includes a media gateway. and a packet switched network, the method comprising:

coupling the circuit switched network to the packet switched network with the interface means, the interface means further comprising
a first network layer for transporting only signaling information assigned to a call and
a second network layer for transporting only payload information assigned to the call, wherein the two network layers in the circuit switched network are used for carrying the data transmission, via the interface means, between the circuit switched network and the packet switched network;

processing the signaling information associated with the data transmission in the circuit switched network on the first network layer of the two network layers, wherein the first network layer includes a mobile service switching center;

transferring the payload information associated with the data transmission on the second network layer of the two network layers in the circuit switched network utilizing a protocol stack, the protocol stack comprising:
a first protocol stack in a mobile station, the first protocol stack coupled to
a second protocol stack in a radio network means, the second protocol stack being coupled to
a third protocol stack in the media gateway; and
information frame generating means for generating an information frame containing payload information associated with the data transmission; and
responsive to detecting a received, empty information frame a first discontinuous transmission (DTX) means in the second protocol stack discarding the received empty information frame to improve the data rate, wherein remaining information frames are forwarded to the packet switched network via a direct connection between the radio network means and the media gateway.

2. The method of claim 1, wherein the circuit switched network is a cellular telephone network, the radio network means is a Base Transceiver Station (BTS), the packet switched network is the Internet, and the second layer of the two network layers further comprises a number of base stations, each base station connected directly to the interface means for payload exchanges in the second layer and information frame generating means for generating the information frame with a receive sequence number.

3. The method of claim 1, wherein the circuit switched network is a GSM cellular telephone network.

4. The method of claim 2, further comprising the step of adapting a transfer rate of the payload information within the BTS.

5. The method of claim 1, further comprising the step of disabling a second DTX means in the third protocol stack.

6. The method of claim 2, further comprising generating information frames containing payload information in the first protocol stack.

7. The method of claim 6, further comprising the step of monitoring the generated information frames for determining whether the generated information frames contain payload information.

8. The method of claim 7, wherein the step of monitoring the generated information frames further comprises the step of detecting an "S" frame, which carries supervisory information, and if the "S" frame receive sequence number is equal to that of a previous frame, discarding the "S" frame.

9. The method of claim 7, further comprising the step of monitoring the generated information frames in the second protocol stack.

10. A method for data transmission from a packet switched network, via an interface means that includes a media gateway, to a circuit switched network, the method comprising:

coupling the packet switched network to the circuit switched network with the interface means, wherein two network layers in the circuit switched network are used for carrying the data transmission via the interface means between the packet switched network and the circuit switched network, the network layers including a first layer for transporting only payload information assigned to a call and a second layer for transporting only signaling information assigned to the call;

receiving the data transmission from the packet switched network in the media gateway;

processing signaling information associated with the data transmission in the circuit switched network on the first network layer of the two network layers;

transferring payload information associated with the data transmission in the circuit switched network on the second layer of the two network layers, wherein the second layer comprises a number of base stations directly connected to the interface means and utilizing a protocol stack, the protocol stack comprising:

a first protocol stack in the media gateway, the first protocol stack coupled to a second protocol stack in a radio network means, the second protocol stack coupled to a third protocol stack in a mobile station; and information frame generating means for generating an information frame containing the payload information of the data transmission; and responsive to detecting a received, empty information frame, a discontinuous transmission (DTX) means in the first protocol stack discarding the received empty information frame to improve the data rate, wherein remaining information frames are forwarded to the mobile station via a direct connection between the media gateway and the radio network means.

11. The method of claim 10, wherein the circuit switched network is a cellular telephone network, the radio network means is a Base Transceiver Station (BTS), the packet switched network is the Internet, and the second layer of the two network layers further comprises information frame generating means for generating the information frame with a receive sequence number.

12. The method of claim 10, wherein the circuit switched network is a GSM cellular telephone network.

13. The method of claim 11, further comprising the step of adapting a transfer rate of the payload information within the BTS.

14. The method of claim 10, further comprising the step of disabling a second DTX means in the second protocol stack.

15. The method of claim 11, further comprising the step of generating information frames, containing payload information, in the first protocol stack.

16. The method of claim 15, further comprising the step of monitoring the generated information frames for determining whether the generated information frames contain payload information.

17. The method of claim 16, further comprising the step of monitoring the generated information frames in the first protocol stack.

18. The method of claim 16, wherein the step of monitoring the generated information frames further comprises the step of detecting an "S" frame, which carries supervisory information, and if the "S" frame receive sequence number is equal to that of a previous frame, discarding the "S" frame.

19. A communication network element for data transmission from a circuit switched network via an interface means that includes a media gateway to a packet switched network, the network element comprising:

a first network layer, including a mobile service switching center, in the circuit switched network connected to the interface means for transporting and processing only signaling information associated with the data transmission;

a second network layer in the circuit switched network connected to the interface means for transferring only payload information associated with the data transmission, the second network layer utilizing a protocol stack, the protocol stack comprising:

a first protocol stack in a mobile station, the first protocol stack coupled to a second protocol stack in a radio network means, the second protocol stack being coupled to a third protocol stack in the media gateway;

means for generating information frames containing the payload information received from the circuit switched network; and a first discontinuous transmission (DTX) means in the second protocol stack for discarding an empty information frame to improve the data rate, wherein remaining information frames are forwarded on to the packet switched network via a direct connection between the media gateway and the radio network means wherein the radio network means comprises a number of base stations.

20. The communication network element of claim 19, further comprising means in the second protocol stack for monitoring the generated information frames.

21. The communication network element of claim 19, wherein the circuit switched network is a cellular telephone network, the radio network means is a Base Transceiver Station (BTS), the packet switched network is the Internet, and the information frame generating further comprises means for generating the information frame with a receive sequence number.

22. The communication network element of claim 19, wherein the circuit switched network is a GSM cellular telephone network.

23. The communication network element of claim 21, further comprising means for adapting a transfer rate of the payload information within the BTS.

24. The communication network element of claim 19, further comprising means for disabling a second DTX means in the third protocol stack.

25. The communication network element of claim 19, further comprising means in the first protocol stack for generating information frames containing payload information.

26. The communication network element of claim 25, further comprising means for monitoring the generated information frames for determining whether the generated information frames contain payload information.

27. The communication network element of claim 26, further comprising means for monitoring the generated information frames in the second protocol stack.

28. The communication network element of claim 26, wherein the means for monitoring the generated information frame further comprises means for discarding a detected "S" frame, which carries supervisory information, if the detected "S" frame receive sequence number is equal to that of a previous frame.

29. A communication network element for data transmission from a packet switched network via an interface means that includes a media gateway to a circuit switched network, the communication network element comprising:
   a first network layer, in the circuit switched network, connected to the interface means for transporting and processing only signaling information associated with the data transmission;
   a second network layer, in the circuit switched network, connected to the interface means and utilizing a protocol stack for transferring only payload information associated with the data transmission, the protocol stack comprising:
      a first protocol stack in the media gateway, the first protocol stack being coupled to
      a second protocol stack in a radio network means, the second protocol stack being coupled to
      a third protocol stack in a mobile station and
      information frame generating means for generating an information frame containing the payload information associated with the data transmission; and
   a discontinuous transmission (DTX) means in the first protocol stack for discarding a received, empty information frame to improve data transfer rate, wherein remaining information frames are forwarded to the mobile station via a direct connection between the media gateway and the radio network means wherein the radio network means comprises a number of base stations.

30. The communication network element of claim 29, wherein the circuit switched network is a cellular telephone network, the radio network means is a Base Transceiver Station (BTS), the packet switched network is the Internet and the information frame generating means further comprises means for generating the information frame with a receive sequence number.

31. The communication network element of claim 29, wherein the circuit switched network is a GSM cellular telephone network.

32. The communication network element of claim 30, further comprising means for adapting a transfer rate of the data transmission within the BTS.

33. The communication network element of claim 29, further comprising means for disabling a second DTX means in the second protocol stack.

34. The communication network element of claim 29, further comprising means in the first protocol stack for generating information frames containing the payload information.

35. The communication network element of claim 34, further comprising means for monitoring the generated information frames for determining whether the generated information frames contain the payload information.

36. The communication network element of claim 35, wherein the means for monitoring the generated information frame further comprises means for discarding a detected "S" frame, which carries supervisory information, if the detected "S" frame receive sequence number is equal to that of a previous frame.

* * * * *